(12) United States Patent
Tonosaki et al.

(10) Patent No.: US 6,270,857 B2
(45) Date of Patent: Aug. 7, 2001

(54) METHOD OF MODIFYING A SURFACE OF AN INSULATOR

(75) Inventors: Minehiro Tonosaki, Kanagawa; Mitsunori Ueda, Chiba; Masato Kobayashi; Hiroyuki Okita, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/371,119

(22) Filed: Aug. 10, 1999

(30) Foreign Application Priority Data

May 31, 1999 (JP) ................................. 11-152936

(51) Int. Cl.[7] .............................. C08J 2/54; C23C 14/48; C23C 14/30; B05D 3/14; B05D 3/06
(52) U.S. Cl. ...................... 427/496; 427/506; 427/524; 427/525; 427/527; 427/551; 427/596
(58) Field of Search .................... 427/551, 552, 427/596, 597, 566, 567, 524, 525, 496, 506, 527

(56) References Cited

U.S. PATENT DOCUMENTS

| | | | |
|---|---|---|---|
| 2,465,713 | * | 3/1949 | Pimmick ............................ 427/551 |
| 3,645,786 | * | 2/1972 | Tannenberger et al. ............. 427/596 |
| 3,647,520 | * | 3/1972 | Gor et al. ........................... 427/506 |
| 3,697,305 | * | 10/1972 | Sumitaka et al. .................... 427/551 |
| 3,865,597 | * | 2/1975 | Broyde .............................. 427/506 |
| 4,605,612 | * | 8/1986 | Asao et al. ......................... 427/506 |
| 4,639,301 | * | 1/1987 | Doherty et al. .................... 427/524 |
| 4,764,394 | | 8/1988 | Conrad . |

OTHER PUBLICATIONS

Adler, et al., Repetitively Pulsed Metal Ion Beams for Ion Implementation, Nuclear Instruments and Methods in Physics Research, 1985, 123–128, B6, Elsevier Science Publishers B.v., North Holland, No Month.

Conrad, Sheath Thickness and Potential Profiles of Ion–Matrix Sheaths for Cylindrical and Sphereical Electrodes, *J. Appl. Phys.*, Aug. 1, 1987, 777–779, 63 (3), American Institute of Physics, College Park, MD, USA.

Adler, et al., Conformal Ion Implementation Using Pulsed Plasma Sources, J. Vac. Sci. Technol., Mar./Apr. 1999, 883–887, B 17(2), Ameican Vacuum Society, New York, NY, USA.

* cited by examiner

*Primary Examiner*—Marianne Padgett
(74) *Attorney, Agent, or Firm*—Sonnenschein, Nath & Rosenthal

(57) ABSTRACT

When an insulator is irradiated with an electron beam, a pulse-shape voltage is applied to the insulator from a pulse power source. As a result, a charge-up state of the insulator can be prevented. If an object which must be subjected to surface modification is an insulator, the object can effectively be irradiated with the electron beam to perform the surface modification.

8 Claims, 3 Drawing Sheets

METHOD OF MODIFYING A SURFACE OF AN INSULATOR

BACKGROUND OF THE INVENTION

1. Field of the Invention

The present invention relates to a method for surface modification by irradiating an insulator with an electron beam to modify the surface of the insulator.

2. Description of the Related Art

A method has been employed which subjects a work which must be processed to surface modification to modify a variety of physical and chemical characteristics including hardness, elasto-plasticity, electric conductivity, lubricity, durability, moisture resistance, corrosion resistance, wettability and gas permeability. As the foregoing method, a method (hereinafter called an "electron-beam applying method ") has been known with which a work which must be processed is irradiated with an electron beam to modify the surface of the work.

The electron-beam applying method is, as shown in FIG. 1, performed such that a work 101 which must be processed and which is secured to a holder 100 in a vacuum chamber is irradiated with an electron beam 103 emitted from an electron-beam source 102. The foregoing electron-beam applying method is not required to heat the work 101. Moreover, control of the energy of the electron beam which must be applied enables a variety of characteristics of the work 101 to be modified. Therefore, the electron-beam applying method has widely been used in an industrial field for manufacturing semiconductors.

The electron-beam applying method of the foregoing type, however, has been limited to a case in which the work 101 which must be processed is made of a material, such as metal, having conductivity. If the work 101 which must be processed is made of an insulator, such as plastic, the electron-beam applying method is limited to a case, for example, a polymerizing process, which does not require a process which must be completed in a short time. The reason for this lies in that employment of the electron-beam applying method in a case where the work 101 which must be processed is an insulator causes electric charges to be accumulated in the work 101 which must be processed. Thus, a so-called a "charged-up state " is realized. In the foregoing case, effective irradiation of the work 101 which must be processed with the electron beam cannot be performed. Hence it follows that the time to complete the process is elongated excessively when the electron-beam applying method is applied to the insulator. As a result, there arises a problem in that the productivity cannot easily be improved.

When the work 101 which must be processed is made of an insulator, such as glass, the conventional electron-beam applying method causes the glass work 101 to be heated owing to irradiation with the electron beam. As a result, conductivity is realized so that the charge-up state is neutralized. When the conventional electron-beam applying method is applied to the insulator, such as plastic, there arises a problem in that the work 101 which must be processed is melted or deformed owing to the heat generated by the electron beam.

OBJECT AND SUMMARY OF THE INVENTION

In view of the foregoing, an object of the present invention is to provide a method for surface modification of an insulator which is capable of effectively performing surface modification by using an electron-beam applying method if an insulator is subjected to the surface modification.

According to the present invention, it provides a method for surface modification of an insulator by electron beam being irradiated on the insulator; the improvement: applying pulse-shape voltage to the insulator while the electron beam is irradiated on the insulator.

According to the foregoing method for surface modification of an insulator arranged to apply the pulse-shape voltage, a fact that the insulator is brought into an electrical non-equilibrium, that is, a charge-up state, can be prevented even if the insulator is continuously irradiated with electron beams. Therefore, even the insulator can continuously and effectively be irradiated with the electron beams. As a result, time required to complete the process can be shortened, causing the productivity to be improved.

According to the present invention, surface modification using the electron-beam applying method can be applied to plastic, which is the insulator. Therefore, the plastic can efficiently be subjected to the surface modification. That is, according to the present invention, plastic can be subjected to surface modification using electron-beam applying method so that physical and chemical characteristics are improved which include hardness, elasto-plasticity, electric conductivity, lubricity, durability, moisture resistance, corrosion resistance, wettability and gas permeability. Therefore, the present invention enables a variety of materials which have been made of metal or glass into low-cost plastic. Hence it follows that a significant industrial advantage can be obtained.

DETAILED DESCRIPTION OF THE PREFERRED EMBODIMENT

Figure 1:
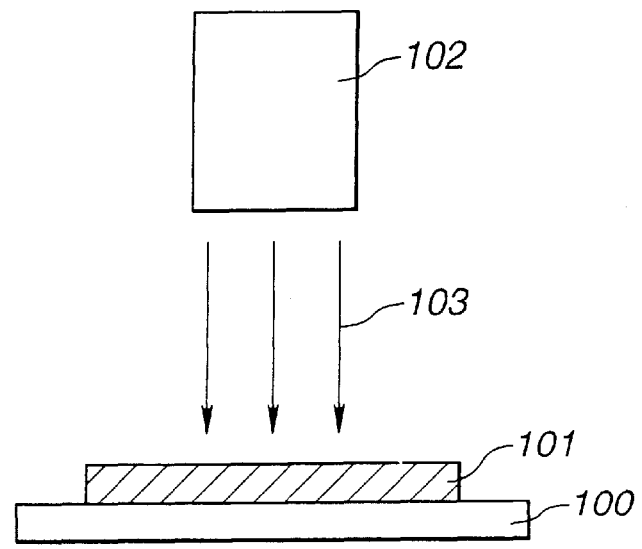
FIG. 1 is a schematic view showing a conventional electron-beam applying method.
Figure 2:
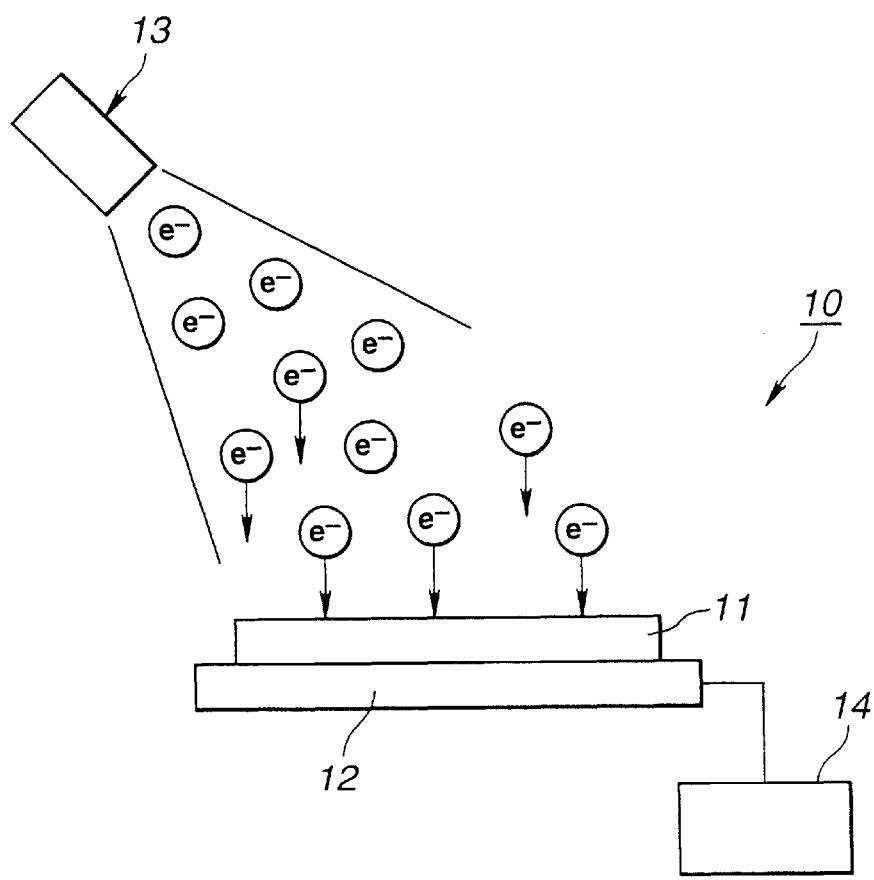
FIG. 2 is a schematic view showing an example of the structure of a surface modification apparatus which is operated when a method for surface modification of an insulator according to the present invention is performed.

An embodiment of the present invention will now be described with reference to the drawings. In this embodiment, a method for surface modification of an insulator according to the present invention is performed by using a surface modification apparatus 10 structured as shown in FIG. 2. The surface modification apparatus 10 is an apparatus for modifying the surface of a work 11 which must be processed by using a so-called electron-beam applying method such that the work 11 made of an insulator is irradiated with an electron beam.

The material of the work 11 which must be processed by the method according to the present invention is exemplified by plastic, such as amorphous polyolefine (APO), polycarbonate (PC), polymethylmethacrylate (PMMA), polyethylene terephthalate (PET), acrylic resin, epoxy resin, polyimide resin or vinyl chloride resin; carbon; or glass.

As shown in FIG. 2, the surface modification apparatus 10 incorporates a holder 12 disposed in a vacuum chamber (not shown); an electron-beam source 13 for irradiating the work 11 secured to the holder 12 with an electron beam; and a pulse source 14 for applying a pulse-shape voltage to the work 11. The inside portion of the vacuum chamber is exhausted by a vacuum pump, such as a cryopump, so that a high vacuum level of about $10^{-6}$ Torr is maintained.

The holder 12 supports the work 11. An insulating support member joined to the vacuum chamber secures the holder 12 to the inside portion of the vacuum chamber. When the work 11 made of the insulator is subjected to the surface modification, the work 11 is secured to the holder 12.

The holder 12 includes a pipe (not shown) for introducing cooling water. The pipe for introducing cooling water is allowed to extend to the outside portion of the vacuum chamber through, for example, the support member for the holder 12. Cooling water is allowed to flow in the pipe for introducing cooling water so that the work 11 secured to the holder 12 is cooled.

When the work 11 is irradiated with the electron beam by the electron-beam applying method, the temperature of the work 11 is raised. When the work 11 is made of a material, such as plastic, which must avoid a process which is performed at high temperatures, rise in the temperature caused from the irradiation with the electron beam raises a problem. Since the surface modification apparatus 10 incorporates the holder 12 having the water-cooling function, the temperature of the work 11 can be controlled when the work 11 is irradiated with the electron beam. Therefore, the surface modification apparatus 10 is able to prevent rise in the temperature of the work 11 when the irradiation with the electron beam is performed if the work 11 is made of a material, such as plastic, which must avoid the process which is performed at high temperatures.

The electron-beam source 13 has a function for generating an electron beam with which the work 11 is irradiated. The electron-beam source 13 may be a so-called electron gun incorporating a cathode, such as. The present invention is not limited to the structure of the electron-beam source 13. Any one of a variety of conventional electron guns may be employed.

The pulse source 14 is electrically connected to the holder 12 in the vacuum chamber. The pulse source 14 has a function for applying pulse-shape voltage to the work 11 through the holder 12. The pulse source 14 may be constituted by any one of a variety of conventional circuit structures. An example of the structure of the pulse source 14 will now be described.

Figure 3:
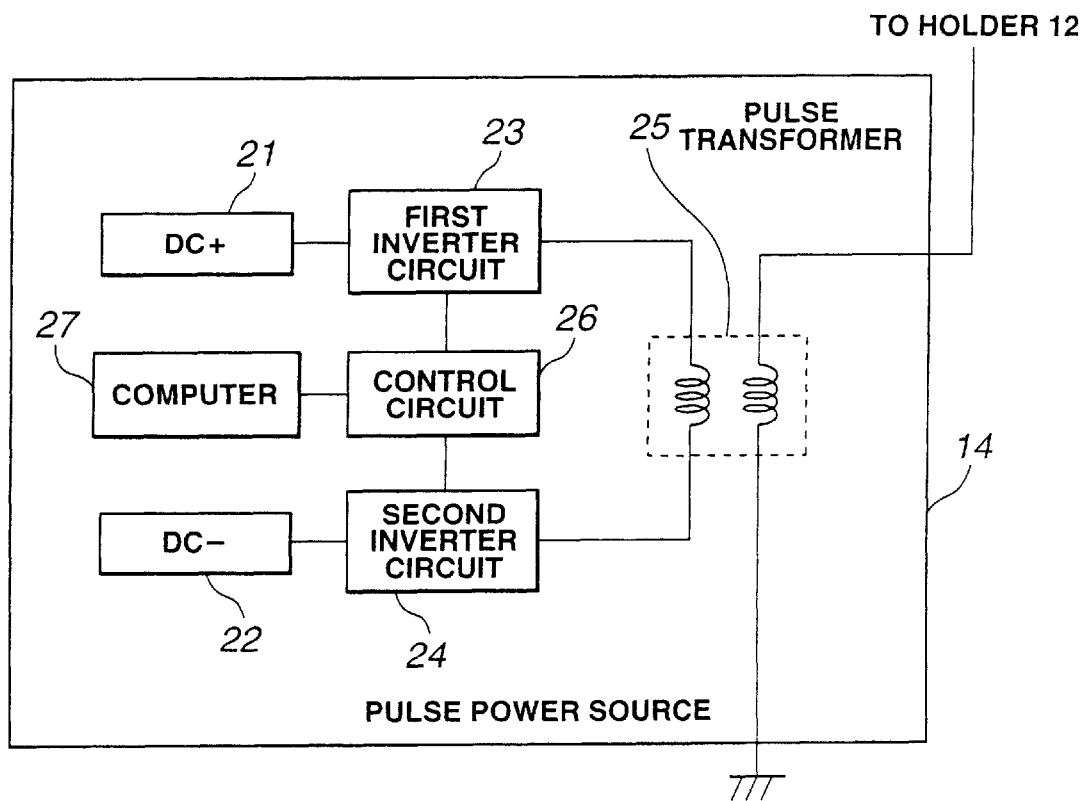
FIG. 3 is a schematic view showing an example of the structure of a circuit in a pulse power source provided for the surface modification apparatus.

For example, as shown in FIG. 3, the pulse source 14 incorporates a first power source 21 serving as a positive DC voltage source, a second power source 22 serving as a negative voltage source, a first inverter circuit 23 for converting DC voltage supplied from the first power source 21 into pulse-shape voltage, a second inverter circuit 24 for converting DC voltage supplied from the second power source 22 into pulse-shape voltage, a pulse transformer 25 for raising the level of the pulse-shape voltages applied from the first and second inverter circuits 23 and 24, a control circuit 26 for controlling the first and second inverter circuits 23 and 24 and a computer 27 for controlling the operation of the control circuit 26.

The first inverter circuit 23 of the pulse source 14 converts the positive DC voltage supplied from the first power source 21 into the pulse-shape voltage. The second inverter circuit 24 converts the negative DC voltage supplied from the second power source 22 into the pulse-shape voltage.

The outputs from the first and second inverter circuits 23 and 24 are controlled by the control circuit 26. In the pulse source 14, the first inverter circuit 23 for outputting the positive pulse-shape voltage and the second inverter circuit 24 for outputting the negative pulse-shape voltage are operated in parallel. Moreover, the pulse peak value, the first transition time of the pulse, the intervals between pulses and the pulse width of each of the positive and negative pulse-shape voltages output from the first and second inverter circuits 23 and 24 can independently be changed.

Specifically, the control circuit 26 switches the output from the first inverter circuit 23 and that from the second inverter circuit 24 and controls the outputs from the same in such a manner that the positive pulse-shape voltage output from the first inverter circuit 23 and the negative pulse-shape voltage output from the second inverter circuit 24 are alternately output. The pulse-shape voltages controlled by the control circuit 26 and output from the first and second inverter circuits 23 and 24 are supplied to a primary coil of the pulse transformer 25.

The level of the pulse-shape voltage supplied to the pulse transformer 25 is raised by the pulse transformer 25. The pulse transformer 25 has either of terminals of a secondary coil which is grounded. Moreover, the other terminal of the secondary coil is allowed to pass through the support member for supporting the holder 12 so as to be connected to a surface of the holder 12 for fixing the work II which must be processed. When the work 11 is secured to the holder 12, the pulse-shape voltage, the level of which has been raised by the pulse transformer 25, is applied to the work 11.

The pulse source 14 is structured such that the pulse peak value, the pulse first transition time, the intervals between pulses, the pulse width or the order of the positive and negative pulses can arbitrarily be controlled by issuing an instruction to the computer 27. That is, when the pulse source 14 is operated, the waveform of the pulse-shape voltage which must be applied to the work 11 which must be processed is communicated to the computer 27. In accordance with the communicated instruction, the computer 27 issues an instruction to the control circuit 26 in such a manner that the pulse-shape voltage having a required waveform is applied to the work 11 which must be processed. In accordance with the instruction issued from the computer 27, the control circuit 26 controls the outputs from the first and second inverter circuits 23 and 24.

Specifically, the pulse source 14 is enabled to independently control the peak value of each of the positive and negative pulse-shape voltages which are applied to the work 11 to satisfy a range from about 1 kV to about 100 kV. The pulse width can be controlled to satisfy a range from about 1 µs to about 50 µs. Moreover, the intervals of the pulses (the periods of pulses) can be controlled to satisfy a range from about 1 kHz to about 100 kHz. Also the order of outputting the positive and negative pulse-shape voltages can be controlled by the computer 27 connected to the control circuit 26.

As described above, the surface modification apparatus 10 is structured to incorporate the control circuit 26 which performs switching between the positive pulse-shape voltage and the negative pulse-shape voltage and adjusts the outputs. Thus, the waveform of the pulse-shape voltage which must be applied to the work 11 can arbitrarily be controlled.

It is preferable that the first and second inverter circuits 23 and 24 of the pulse source 14 are constituted by circuits incorporating semiconductor devices. Since the inverter circuit incorporating the semiconductor devices is a low-cost circuit, the first and second inverter circuits 23 and 24 included in the pulse source 14 can be realized at a low cost. Since the size of the circuit incorporating the semiconductor devices can easily be reduced, the size of the pulse source 14 can be reduced.

When the first and second inverter circuits 23 and 24 are constituted by the circuits incorporating the semiconductor devices, a high output voltage cannot easily be obtained from each of the first and second inverter circuits 23 and 24. In the foregoing case, the levels of the outputs from the first and second inverter circuits 23 and 24 must be raised by the pulse transformer 25 similarly to the foregoing pulse source 14.

The first and second inverter circuits 23 and 24 may be constituted by circuits incorporating vacuum tubes. The first and second inverter circuits incorporating the vacuum tubes enable a high output voltages to be obtained. Therefore, when the circuits incorporating the vacuum tubes are employed, the pulse-shape voltages output from the first and second inverter circuits 23 and 24 may directly be applied to the work 11 which must be processed such that the pulse transformer 25 is bypassed.

When the surface modification apparatus 10 structured as described above is used to subject the work 11 made of the insulator to surface modification by performing irradiation with an electron beam, the work 11 which must be processed is secured to the holder 12 disposed in the vacuum chamber. Then, the inside portion of the vacuum chamber is exhausted by a vacuum pump so that a high vacuum state is realized. The pressure in the vacuum chamber is made to be, for example, about $10^{-6}$ Torr.

If the work 11 is made of a material, such as plastic, which must avoid a process which is performed at high temperatures, cooling water is allowed to flow in the pipe for introducing cooling water included in the holder 12. Thus, excessive rise in the temperature of the work 11 is prevented.

Then, an electron beam is generated by the electron-beam source 13 so that the work 11 is irradiated with the electron beam. Simultaneously with the irradiation with the electron beam, the pulse-shape voltage generated by the pulse source 14 is applied to the work 11 which must be processed.

Since the work 11 is irradiated with the electron beam, the atomic structure and the composition of the irradiated surface of the work 11 are modified. Thus, the physical and chemical characteristics are changed which include the hardness, elasto-plasticity, electric conductivity, lubricity, durability, moisture resistance, corrosion resistance, wettability and gas permeability. Thus, a layer having a modified surface can be formed. Specifically, when epoxy resin is irradiated with an electron beam, a polymerizing reactions occur so that the epoxy structure is changed to double bond carbon-carbon (refer to Hirai et al., J. Electrochem. Soc., 118 (1971) 669).

As described above, the waveform of the pulse-shape voltage which is applied to the work 11 which must be processed is controlled as described above. Thus, the irradiation density and/or the irradiation energy of the electron beam which must be applied are controlled. Thus, the surface modification can be performed such that the layer having the modified surface and formed on the surface of the work 11 has required characteristics.

Figure 4:
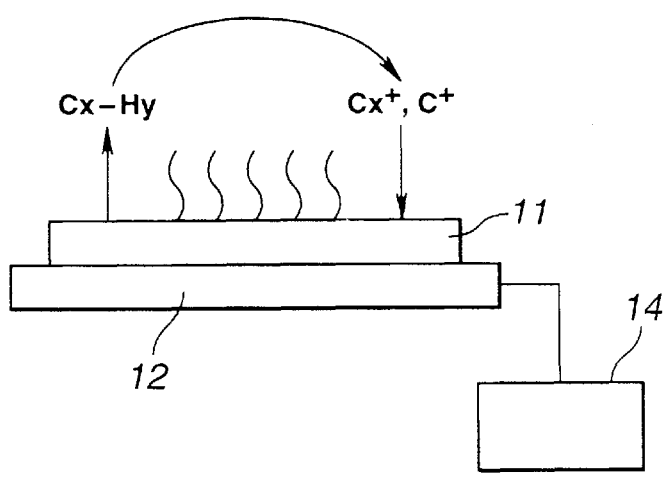
FIG. 4 is a schematic view showing a state in which ions are implanted into a work which must be processed by the method for surface modification of an insulator according to the present invention.

When the work 11 which is the insulator is a material, such as plastic, which contains carbon, carbon, hydride and oxygen molecules existing adjacent to the surface of the work 11 are knocked out caused by the irradiation energy of the applied electron beam, as shown in FIG. 4. Therefore, radicals and ions of the foregoing elements are sometimes produced. In FIG. 4, the electron-beam source 13 and the electron beam are omitted.

The molecules, such as the radicals and ions, generated from the work 11 which must be processed are implanted into the work 11 owing to the pulse-shape voltage applied to the work 11. Thus, the foregoing molecules are again implanted. When the molecules sputtered from the work 11 and/or molecules evaporated and sublimated owing to heating are again implanted so that the layer having the modified surface in which the physical and chemical characteristics have been changed is formed on the surface of the work 11.

That is, when the molecules sputtered from the work 11 and/or particles evaporated and sublimated owing to heating are again implanted into the work 11, the work 11 also serves as the ion source. Therefore, the surface modification apparatus 10 is able to perform so-called ion implantation into the work 11 without a necessity of employing an independent ion source. As a result, the surface modification apparatus 10 can be employed as a low-cost ion implanting apparatus which does not require an ion source.

As described above, the work 11 is irradiated with the electron beam and applied with the pulse-shape voltage. Thus, a layer having a surface, in which the atomic structure and the composition have been changed owing to the irradiation with the electron beam and ion implantation, can be formed on the surface of the work 11 which must be processed.

Specifically, the electron beam emitted from the electron-beam source 13 is accelerated in a direction toward the work 11 when the positive pulse-shape voltage has been applied to the work 11. Thus, the work 11 can effectively be irradiated with the electron beam. The irradiation density and/or the irradiation energy of the electron beam which is applied to the work 11 depend on the pulse peak value, the first transition time of the pulse, the intervals of the pulses and the pulse width. Therefore, the waveform of the positive pulse-shape voltage which is applied to the work 11 is controlled so that the irradiation density and/or the irradiation energy of the electron beam which is applied to the work 11 is controlled.

When the irradiation of the work 11 with the electron beam is continued while the positive pulse-shape voltage is being applied, the work 11 is brought to an electrical non-equilibrium, that is, a so-called charge-up state. If the work 11 is brought to the above-mentioned state, irradiation of the electron beam cannot effectively be performed. Therefore, the surface modification apparatus 10 is structured such that the negative pulse-shape voltage is adequately applied to the work 11 which must be processed. Therefore, the electrical non-equilibrium can be prevented.

Specifically, the negative pulse-shape voltage is applied to the work 11 which must be processed so that electric charges accumulated in the work 11 are neutralized. Then, the work 11 can effectively be irradiated with the electron beam when the positive pulse-shape voltage has been applied.

When the negative pulse-shape voltage has been applied to the work 11 which must be processed, molecules generated in a states of radicals and ions from the work 11 are again implanted into the work 11. Thus, so-called ion implantation is performed.

At this time, the pulse peak value, the first transition time of the pulse, the intervals between the pulses and the pulse width of the pulse-shape voltage which is applied to the work 11, that is, the waveform of the negative pulse-shape voltage, is controlled by the pulse source 14. Thus, the degree of neutralization of electric charges accumulated in the work 11 and an amount of molecules which must be again implanted can be controlled.

When the work 11 is irradiated with the electron beam by the above-mentioned method, irradiation of the work 11 which is the insulator with the electron beam can effectively be performed such that the charge-up of the work 11 is prevented. Thus, time required to complete the process can be shortened and the productivity can be improved.

The waveform of the pulse-shape voltage which is applied to the work 11 when the foregoing surface modification apparatus 10 is operated to perform irradiation with the electron beam will now be described with reference to FIG. 5. Note that the waveform of the pulse-shape voltage which is applied to the work 11 is not limited to that shown in FIG. 5. The waveform must be adjusted to perform required surface modification by controlling the pulse peak value, the first transition time of the pulse, the intervals between pluses and the pulse width of the pulse-shape voltage.

Figure 5:
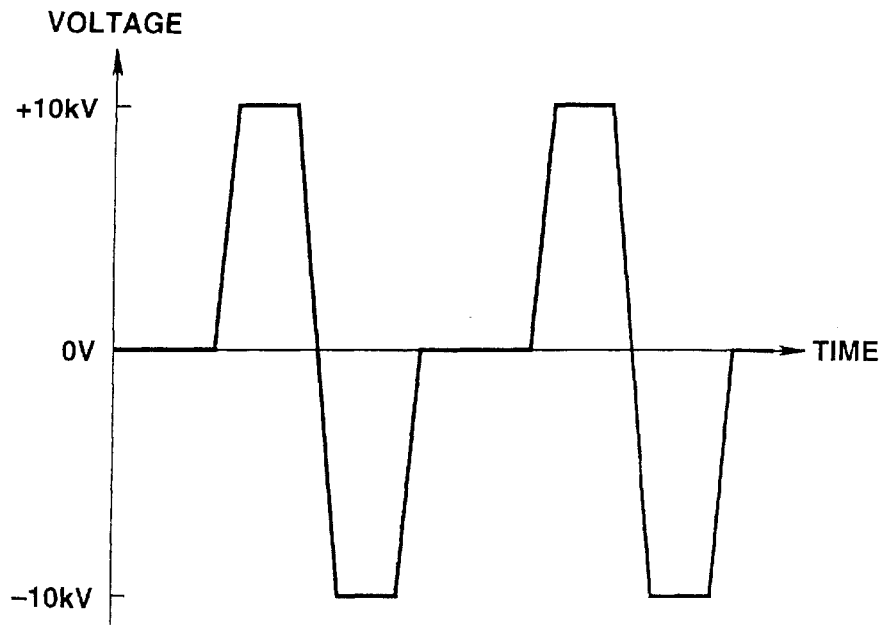
FIG. 5 is a graph showing an example of the waveform of the pulse-shape voltage which is applied to the work which must be processed when the surface modification is performed by the method according to the present invention.

The pulse-shape voltage which is applied to the work 11 which must be processed, as shown in FIG. 5, has a waveform that a positive pulse-shape voltage is initially applied, followed by applying a negative pulse-shape voltage having substantially the same absolute value of the pulse peak and followed by providing a period in which no voltage is applied. Pulse trains having the foregoing waveform is repeatedly applied to the work 11 which must be processed.

When the waveform of the pulse-shape voltage is made to be as shown in FIG. 5, the work 11 can effectively be irradiated with the electron beam when the positive voltage has been applied. When the negative pulse-shape voltage is applied, molecules in the state of radicals and ions from the work 11 are implanted into the work 11. That is, re-implantation is performed. Moreover, electric charges accumulated in the work 11 are neutralized. Hence it follows that the work II can effectively be irradiated with the electron beam when the positive pulse-shape voltage is again applied.

When the pulse-shape voltage having the waveform as shown in FIG. 5 is applied to the work 11 which must be processed, charge-up of the work 11 which is the insulator can be prevented. Thus, irradiation of the work 11 with the electron beams can continuously and effectively be performed.

The surface modification apparatus 10 may be structured such that the electron-beam source 13 can be operated with a pulse or a shutter which can arbitrarily be opened/closed is disposed between the electron-beam source 13 and the work 11. As a result, irradiation of the work 11 with the electron beam can intermittently be performed. When irradiation with the electron beam is intermittently performed in synchronization with the pulse-shape voltage which is applied to the work 11, only irradiation of the work 11 with the electron beam may be performed. As an alternative to this, only implantation of ions may be performed. It leads to a fact that the surface modification of the work 11 can delicately be controlled under desired conditions.

Examples of the method for surface modification according to the present invention using the surface modification apparatus 10 shown in FIG. 2 will now be described.

FIRST EXAMPLE

In this example, the work 11 was a plastic substrate formed into a disc shape obtained by molding epoxy resin.

Initially, the plastic substrate which must be subjected to the surface modification was secured to the holder 12 disposed in the vacuum chamber. Moreover, excessive rise in the temperature of the plastic substrate was prevented by allowing cooling water to flow in the pipe for introducing cooling water disposed in the holder 12. Then, the inside portion of the vacuum chamber was exhausted so that a high vacuum state was realized.

Then, an electron beam was generated by the electron-beam source 13 so that the plastic substrate was irradiated with the electron beam. The irradiation density of the electron beam which was applied to the plastic substrate was 1 mA/cm$^2$. Simultaneously, the pulse-shape voltage was applied to the plastic substrate from the pulse source 14. The waveform of the pulse-shape voltage was formed such that the negative pulse-shape voltage and the positive pulse-shape voltage were alternately applied, as shown in FIG. 5. The pulse-shape voltage had a pulse width of 10 $\mu$s, the positive and negative pulse peak voltages of 10 kV and the interval between the pulses of 0.1 msec (10 kHz). The foregoing plastic substrate was subjected to the surface modification for 10 minutes.

The plastic substrate subjected to the surface modification was subjected to a nano-indentation test by using a thin-film hardness tester MHA-400 manufactured by Nippon Electric Co., Ltd. As a result of measurement in the foregoing test, the hardness of the plastic substrate before the surface modification was 0.2 GPa. The hardness of the plastic substrate subjected to the surface modification was 1.0 GPa. Therefore, the method for surface modification according to the present invention was able to modify the surface of the plastic substrate and change the hardness.

SECOND EXAMPLE

In this example, a plastic substrate obtained by molding polyimide resin was employed as the work 11 which must be processed. Then, the surface modification was performed similarly to the first example. Then, wettability of the plastic substrate subjected to the surface modification with respect to water was measured. The measurement was performed by using a contact angle meter (CA-D contact angle meter manufactured by Kyowa Interface). As a result, the contact angle between the plastic substrate which was not subjected to the surface modification and water was 106°. On the other hand, the angle of contact between the plastic substrate subjected to the surface modification and water was 50°. Therefore, the method for surface modification according to the present invention was able to modify the surface of the plastic substrate and change the wettability.

Then, electric resistance of the surface of the plastic substrate was measured. Thus, the electric resistance before the surface modification was 6 MΩ/sq. On the other hand, the electric resistance after the surface modification was 2 kΩ/sq. Therefore, the method for surface modification according to the present invention was able to modify the surface of the plastic substrate and change the electric resistance of the surface.

THIRD EXAMPLE

In this example, a plastic substrate obtained by molding amorphous polyolefine (APO) was employed as the work 11 which must be processed. Then, the surface modification was performed similarly to the first example. In the third example, the pulse-shape voltage which was applied to the plastic substrate had a waveform similarly to the first example and as shown in FIG. 5 such that the positive pulse-shape voltage and the negative pulse-shape voltage alternately appeared.

In the third example, three sample discs were manufactured under the following surface modification conditions. The other conditions were the same as those in the first example.

Surface Modification Conditions

Pulse Peak Voltage: +10 kV, −10 kV

Interval between Pulses: 10 msec (10 kHz)

Process Duration: 10 minutes

Figure 6:
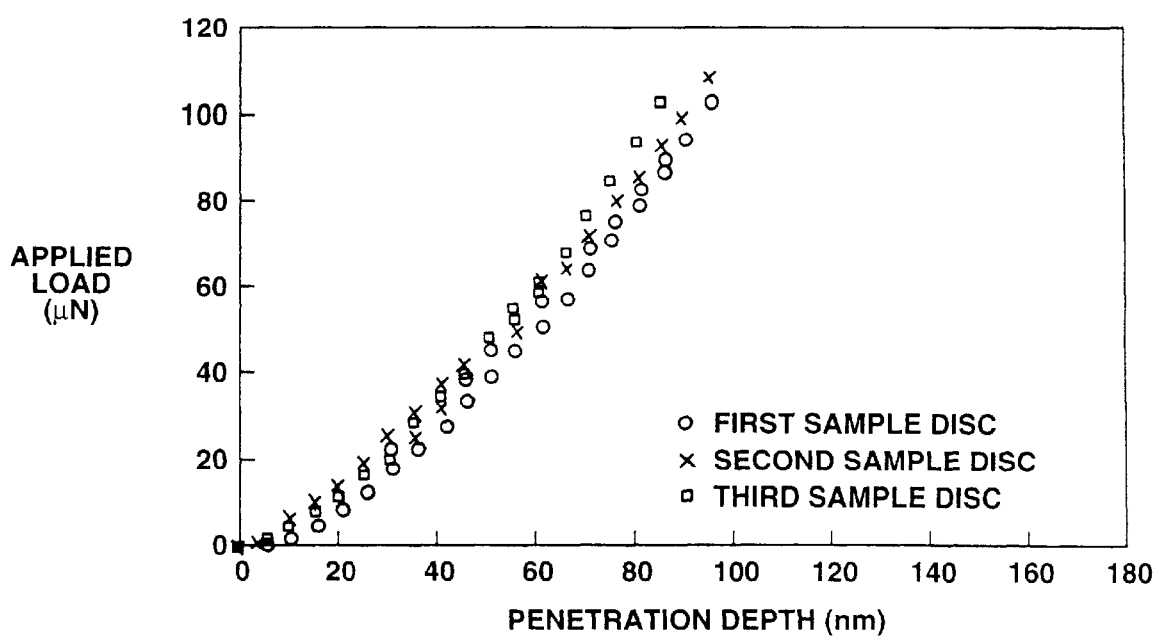
FIG. 6 is a graph showing results of nano-indentation of sample discs subjected to the surface modification by the method according to the present invention.

Each of the manufactured sample discs was subjected to the nano-indentation test similarly to the first example. Results of the measurement were shown in FIG. 6. In FIG. 6, the axis of abscissa stands for a depth of depression by a diamond indentator (Berkovich indentator). The axis of ordinate stands for the magnitude of the depressing load added to the diamond indentator.

As can be understood from the results shown in FIG. 6, the surface modification according to the present invention was able to manufacture a plastic free from plastic deformation.

What is claimed is:

1. A method of modifying a surface of an insulator comprising the steps of:

holding the insulator on a substrate holder;

irradiating an electron beam on the insulator; and applying alternate positive and negative voltage pulses to the substrate holder, thereby implanting secondary ions generated from the insulator into the insulator;

wherein a peak value of the voltage pulses is in a range of 8 kV to 100 kV.

2. The method of modifying a surface of an insulator according to claim 1, wherein a waveform of the voltage pulses includes two or more shapes.

3. The method of modifying a surface of an insulator according to claim 1, wherein at least one of irradiation density and irradiation energy of the electron beam are changed by controlling a waveform of the voltage pulses applied to the substrate holder.

4. The method of modifying a surface of an insulator according to claim 1, wherein the insulator is selected from the group consisting of plastic, carbon and glass.

5. The method of modifying a surface of an insulator according to claim 4, wherein the plastic is selected from the group consisting of amorphous polyolefine, polycarbonate, polymethylmethacrylate, polyethylene terephthalate, acrylic resin, epoxy resin, polyimide resin, and vinyl chloride resin.

6. The method of modifying a surface of an insulator according to claim 1, wherein the electron beam is emitted from an electron gun.

7. The method of modifying a surface of an insulator according to claim 1, wherein a pulse width of the voltage pulses is in a range from 1 $\mu$s to 50 $\mu$s.

8. The method of modifying a surface of an insulator according to claim 1, wherein intervals of the voltage pulses are in a range from 1 kHz to 100 kHz.

* * * * *